2,657,938

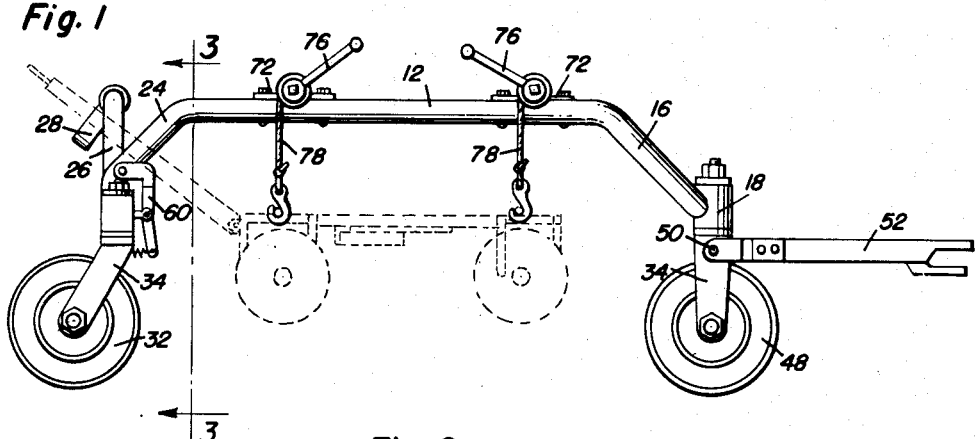
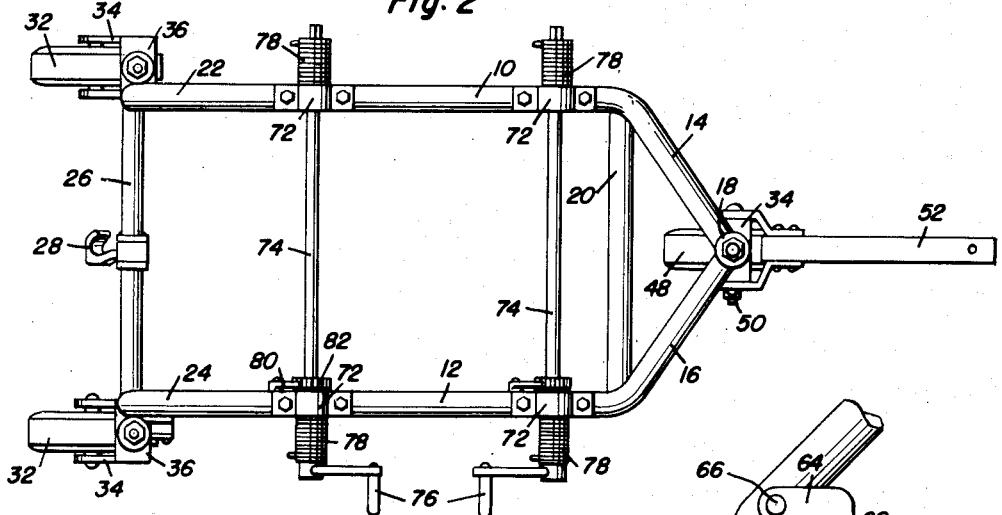
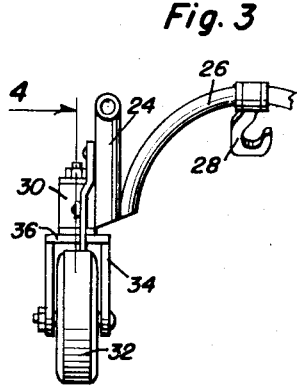
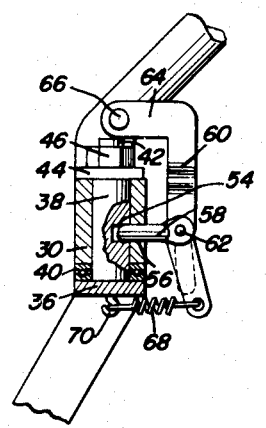
Paul W. Browne
Donald M. Piper
INVENTORS Patented Nov. 3, 1953

UNITED STATES PATENT OFFICE 2,657,938

DISK CARRYING TRAILER

Paul W. Browne, Roodhouse, and Donald M. Piper, Greenfield, Ill.

Application August 7, 1950, Serial No. 178,056

1 Claim. (Cl. 280—62)

This invention comprises novel and useful improvements in a disc carrier and more specifically pertains to a trailer attachment for tractors for conveniently lifting and supporting agricultural disc implements in an improved manner.

The primary object of this invention is to provide a trailer specifically designed for lifting and supporting agricultural implements such as discers for ready handling and transportation of the same to and from their places of use.

A further object of the invention is to provide a trailer in conformity with the foregoing objects which shall be of a very simplified but sturdy construction, will provide ample clearance for receiving the agricultural implement therebeneath and lifting the same; shall have improved means for lifting and retaining the implement beneath the trailer; shall utilize the advantages of caster wheels for supporting the trailer and yet shall be capable of safe and ready transportation upon public highways and the like.

Yet another object of the invention is to provide an improved trailer as set forth in the foregoing objects in which an improved locking means is provided for preventing swiveling movement of one of the rear caster wheels.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a side elevational view of a trailer embodying therein the principles of this invention the same being illustrated as supporting an agricultural disc implement in dotted lines therein;

Figure 2 is a top plan view of the trailer of Figure 1;

Figure 3 is a vertical transverse sectional view taken substantially upon the plane indicated by the sectional line 3—3 of Figure 1; and, Figure 4 is a fragmentary vertical longitudinal sectional detail view taken substantially upon the plane indicated by the sectional line 4 of Figure 3.

Referring now more specifically to the accompanying drawings, wherein like numerals designate similar parts throughout the various views, it will be seen that the trailer incorporating therein the principle of this invention, comprises a frame which may be conveniently and economically constructed of suitable tubular members welded or otherwise rigidly attached to each other, this frame having a mid-portion which is arched or upwardly bowed together with depending front and rear portions. The frame comprises a pair of side members 10 and 12 which have their front ends sloping downwardly and converging towards each other as at 14 and 16 respectively, these ends at their converging extremities being rigidly secured to a tubular sleeve 18 having a vertically disposed axis. The side members 10 and 12 where they emerge into the front portions 14 and 16, are braced by transversely disposed tubular member 20. At their rear ends, the members 10 and 12 slope downwardly as at 22 and 24 respectively. Welded or otherwise rigidly secured adjacent the lower ends of the downwardly sloping portions 22 and 24, is a tubular reinforcing arch 26 which at about its mid-portions provided with a fixedly secured dependent hook 28.

Welded or otherwise secured to the outer side of the lower ends of the sloping portions 22 and 24, are a pair of cylindrical sleeves or bushings 30 which are open at their upper and lower ends. A pair of rear caster wheels 32 are provided, each of these caster wheels including a supporting fork 34 having a horizontal bearing or supporting surface 36 thereon and from which rises a rigidly attached, upwardly extending cylindrical bearing or journal 38 which is rotatably received in the cylindrical sleeve 30. An anti-friction bearing means such as a bearing assembly 40 may be disposed about the journal 38 and between the supporting plate 36 at the lower end of the sleeve 30 as shown in Figure 4. The upper end of the journal 38 is provided with an externally threaded diametrically reduced extension 42 which receives a washer 44 and a lock nut 46 whereby the bearing or journal member 38 may be rotatably received within the sleeve 30 but retained therein and restrained against vertical sliding movement. It will thus be seen that each of the rear caster wheels is swivelly mounted upon the rear end portions of the support frame of the device. A front caster wheel 48 is similarly associated with and journaled in the journal sleeve 18 at the front end of the device. However, support 34 of the front caster wheel has pivotly connected thereto as at 50 the rear end of a tongue 52 whereby the trailer may be coupled to and towed by a tractor or other vehicle.

In order to safely move the trailer upon the highway, it is necessary that any tendency of the rear caster wheels to turn shall be eliminated.

For this purpose, one of the caster wheel assemblies is provided with a locking device to prevent swiveling movement thereof. This locking means may conveniently comprise registering apertures or bores 54 and 56 in the bearing journal 38 and the sleeve 30, and the lock pin 58 is releasably engaged in these bores. In order to yieldingly retain the locking pin in locking position, a lever 60 is provided which intermedius ends pivot as at 62 to locking pin, at one end is provided with a perpendicular disposed arm 64 pivoted as at 66 to the supporting frame, while at its other end it is connected with a tension spring 68 whose other end is secured to a hook 70 upon the plate member 36. It will thus be seen that when it is desired to lock the caster wheel against swiveling movements merely necessary to align or cause registration of the bores 54 and 56, whereupon the pin 58 may be inserted therein and will be retained by the resilient means.

Journaled upon the upper surface of the frame members 10 and 12 as by journal brackets 72 are a pair of transversely disposed windlasses 74, each provided with an operating crank 76, and having at the opposite ends lifting cables 78 secured thereto and wound thereon. A ratchet mechanism in the form of a pawl 80 which is pivoted to one of the frame members as 12 and a pin 82 fixedly secured to each of the windlasses 74 is provided whereby the windlasses may be maintained in their raised position.

As illustrated in Figure 1, the upwardly arched mid-portion of the device is adapted to be disposed above and straddle any suitable implement such as an agricultural disc, whereby the cables 78 of the windlasses may be attached thereto, and the device raised from the ground. The tongue of the implement may be secured in the hook 28 whereby the implement may be readily and safely handled by the trailer.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claim.

Having described the invention, what is claimed as new is:

A disc carrying trailer comprising a tubular frame including a pair of side members, the front ends of said side members sloping downwardly and converging towards each other, the converging ends being rigidly secured to a tubular sleeve having a vertical axis, a front caster wheel journaled in said sleeve, a transverse brace rigidly secured to said side member adjacent the point where they merge into the front ends, the rear ends of said side members sloping downwardly and rearwardly, an upstanding reinforcing arch rigidly secured to the lower portion of said rear ends, a vertically extending sleeve bearing mounted at the lower portion of said rear ends, a pair of caster wheels having cylindrical bearings journaled in said sleeve bearings, locking means for one of said rear caster wheels including registrable apertures in said sleeve and bearing, a lock pin receivable in said registrable apertures, a lever pivoted on said frame, said pin pivoted on said lever, and a spring engaging said frame and said lever for resiliently urging said pin into said apertures.

PAUL W. BROWNE.
DONALD M. PIPER.

References Cited in the file of this patent

UNITED STATES PATENTS

| Number | Name | Date |
|---|---|---|
| 1,598,413 | Armstrong | Aug. 31, 1926 |
| 1,804,541 | Perin | May 12, 1931 |
| 1,958,494 | Pehrsson | May 15, 1934 |
| 2,251,567 | Gould et al. | Aug. 5, 1941 |
| 2,256,557 | Gustin, Jr. | Sept. 23, 1941 |
| 2,494,509 | Gruska | Jan. 10, 1950 |
| 2,496,537 | Huff | Feb. 7, 1950 |
| 2,500,700 | Niles | Mar. 14, 1950 |
| 2,528,672 | Sullivan | Nov. 7, 1950 |
| 2,546,472 | O'Connor | Mar. 27, 1951 |
| 2,560,726 | Jones et al. | July 17, 1951 |